Sept. 22, 1931. T. DE BIASE 1,824,197
AUTOMATIC FEEDER FOR GLASS MOLDING MACHINES
Filed June 7, 1928 3 Sheets-Sheet 2

Inventor:
Tancredo De Biase
By
Attorney

Sept. 22, 1931. T. DE BIASE 1,824,197
AUTOMATIC FEEDER FOR GLASS MOLDING MACHINES
Filed June 7, 1928 3 Sheets-Sheet 3
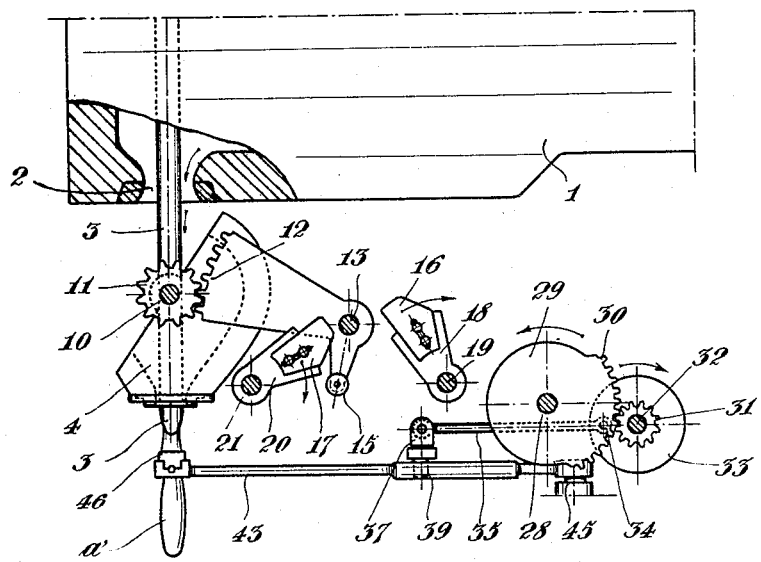
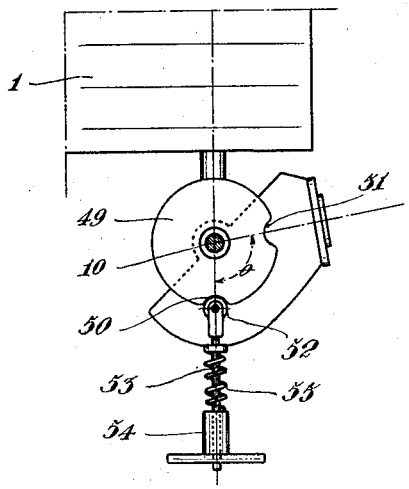
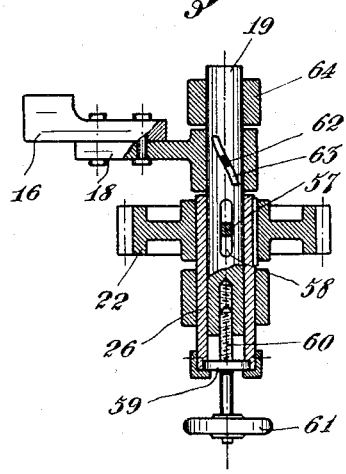
Inventor:
Tancredo De Biase
By [signature]
Attorney Patented Sept. 22, 1931

1,824,197

UNITED STATES PATENT OFFICE

TANCREDO DE BIASE, OF BUENOS AIRES, ARGENTINA

AUTOMATIC FEEDER FOR GLASS MOLDING MACHINES

Application filed June 7, 1928, Serial No. 283,685, and in Argentina May 7, 1928.

The present invention refers to an automatic feeder for glass molding machines, to be applied to continuous furnaces for melting glass and which acts as a connection between the furnace or fore-hearth outlet and the tool or device for molding the glass.

In accordance with the invention the feeder consists primarily of a cup or receptacle of special shape placed underneath the furnace outlet for receiving and storing the melted glass delivered therefrom. This cup or receptacle has a lateral opening for discharging a drop of glass each time the said cup or receptacle is turned over and the opening is lowered. The discharge of the glass from the cup is produced by the action of a needle which descends when the cup is turned. Such turning is effected by the rotation of a pinion fixed on the supporting axle of the cup, with which meshes a toothed sector moved alternatively in one and the other direction by stops placed conveniently and adjustable; these stops acting on an arm of said sector and forcing it to move as previously indicated so as to alternately turn over and return the cup to its previous position.

Moreover, the movements of the elements mentioned are combined with the movement of a pair of shears which, once the cup is turned and the glass drop has been ejected by the said needle, operate to cut off the glass drop and then return to normal position.

In order that the invention may be clearly understood and carried into practice, a preferred form thereof has been shown in the accompanying drawings, in which.

Figure 1:
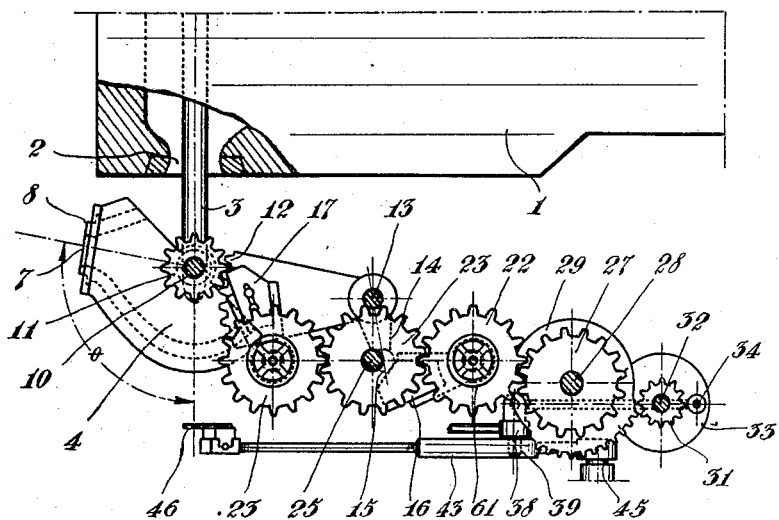
Figure 1 is a part-sectional side view of the complete apparatus.
Figure 2:
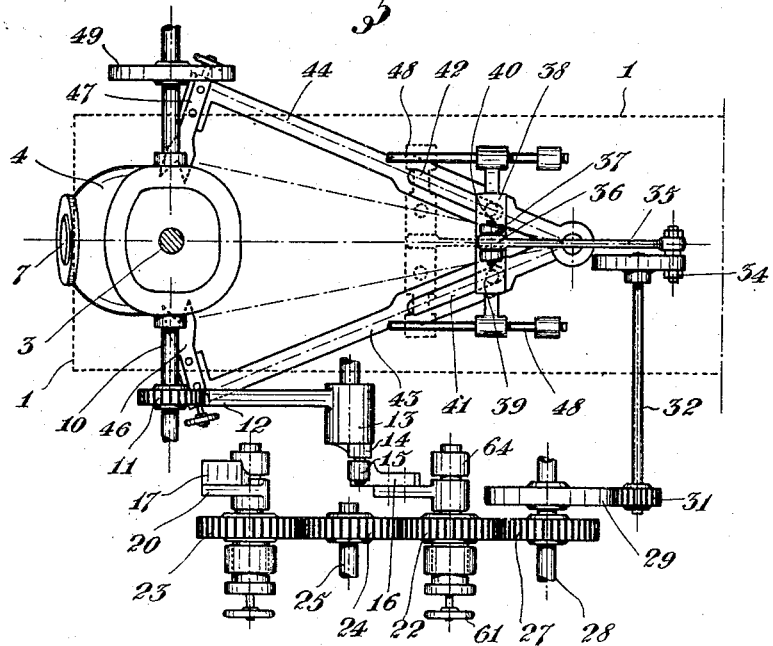
Fig. 2 is a plan view thereof.
Figure 3:
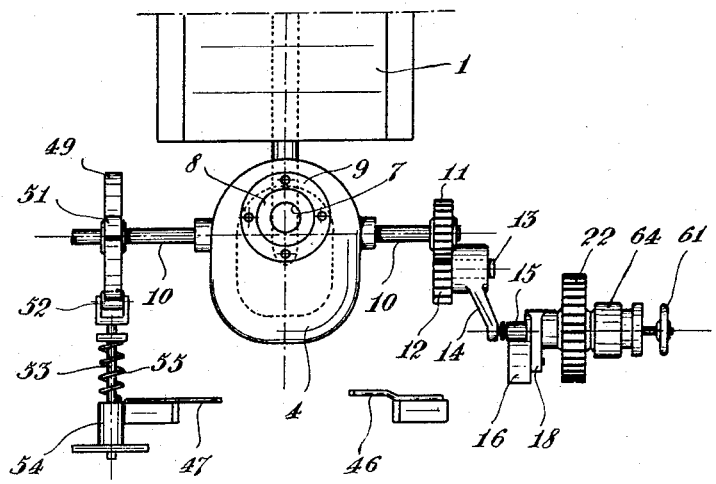
Fig. 3 illustrates a front view.
Figure 4:
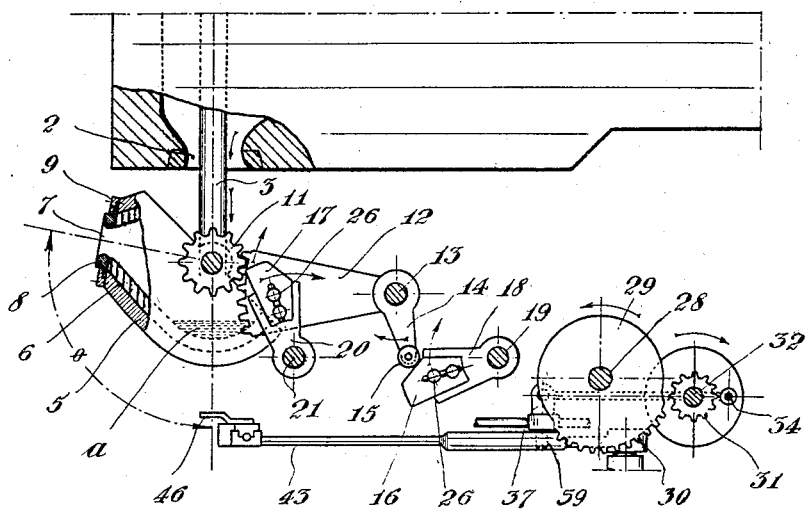

Fig. 4 is a side view, showing the principal elements of the apparatus at the moment when the cup has stored a sufficient quantity of glass and is about to turn over, Fig. 5 is a similar view, but showing the principal elements in the position they adopt when the cup has been turned over, the glass drop has been discharged and the shears have moved to cut the glass drop, Fig. 6 is a view of a device for determining the extreme positions of the cup or receptacle in its turning movements, and Fig. 7 is a sectional view showing details of the mechanism used for regulating the position of the stops which actuate the toothed sector.

Referring more particularly to the drawings, 1 indicates the fore-hearth which discharges the molten glass through opening 2, which is traversed by a reciprocatory element or needle 3 of refractory material. The glass passes through opening 2 around the needle and collects in a cup or receptacle 4 made preferably of iron plate lined inside with a coat or layer 6 of refractory material. This cup has a discharge opening 7, perfectly calibrated and which may be altered in size by changing plate 8 wherein it is formed and which is made fast to the cup by means of an iron ring 9.

The cup is securely mounted at both sides on an appropriately supported axle 10 provided with a pinion 11 meshing with a toothed sector 12 pivoted at 13 and provided with an arm 14 the end of which carries a roll 15. Upon this roll come alternatively in contact parts 16 and 17. the first named being fixed at 26 on a small arm 18 secured to axle 19, while part 17 is similarly attached at 26 to an arm 20 fixed to axle 21. These parts 16 and 17 can be displaced in the direction of the arms.

On axles 19 and 21 are mounted two gear wheels 22 and 23 respectively, with which meshes another gear 24 on shaft 25 which is the driving shaft controlling the whole operation.

As can be clearly seen, gear wheel 22 and gear wheel 23 turn in opposite directions as well as parts 16 and 17.

Meshing with gear 22 there is another similar gear 27 on shaft 28, intended to transmit the motion to the shears, as follows:

On shaft 28 there is a disk 29, partially toothed at 30, which, at the proper moment, can mesh with a pinion 31, forcing same to effect a complete turn; said pinion 31 is fixed to one end of a shaft 32 which carries at the other end a disk 33 provided with a crank pin 34 to which is fixed a pitman 35, the other end of the pitman being pivotally attached to a lug 37 fast on a cross-piece or slide 38 provided with two stops 39 and 40 which run in slots 41 and 42, formed in arms 43 and 44. These arms are attached at one end to a common pivot 45, and their free ends carry the shear blades 46 and 47 secured by screws adjustable with respect to the arms.

Cross-piece 38 is guided by two rods 48 on which its ends are slidably mounted, and on one end or extension of shaft 10 which supports the cup or receptacle there is fixed a disk 49 provided with peripheral notches 50 and 51. These are engaged in alternation at each turn of the cup by a small roll 52 supported by a stem 53 guided at 54 and provided with a spring 55 that constantly tends to press it against the periphery of disk 49 in order to determine the extreme positions of the cup when turning.

Parts 16 and 17, jointly with their supporting arms 18 and 20, can effect an angular displacement with respect to the corresponding axles 19 and 21. To this end, each axle (for instance, axle 19, Fig. 7), receives motion through gear 22 on sleeve 56 and transmits same to axle 19 with the aid of a key or pin 57 capable of moving within a slot 58 in the axle. At the end of sleeve 56 there is arranged a disk 59 which can turn freely in said sleeve and is fast on a screw 60 adapted to be rotated by a handle 61, which screw threads into a socket formed in the end of axle 19. Arm 18, is secured to shaft 19 by means of a pin or key 62 which slidably engages in an inclined slot 63 provided in axle 19. Under these conditions, on moving handle 61 and with it screw 60, axle 19 will be moved forward and backwards thereby shifting slot 63 and forcing pin 62 to displace arm 18 and part 16 radially. This mechanism is mounted on supports 64.

*Operation:* As has been previously said, the glass falls from the furnace chamber 1, through opening 2, around needle 3 and collects at *a* within the cup of receptacle 4, which is now in the position shown in Figure 4. Supposing that the amount of glass deposited therein corresponds to one complete charge of the molding machine, at this moment must be produced the turning over of the cup for which purpose part 16 will be in the appropriate position to contact with and shift roll 15 leftward, forcing sector 12 to rotate in the direction indicated by the arrow and, as said sector meshes with pinion 11 fixed to the cup, the latter will be forced to turn through angle $\theta$. At the same time, teeth 30 on disk 29 will be nearly in mesh with pinion 31 for initiating the operation of closing the shears. Thereafter, the device will work following the movements indicated and the cup 4 will have turned sufficiently to occupy the position shown on Figure 5. At the moment when the turning over of the cup takes place, the glass contained therein will fall by gravity towards opening 7, through which it will be ejected by the action of needle 3 which will thereupon descend. The emerging glass takes the form of a drop $a'$, and at this very moment the teeth 30 of the disk 29 will have turned the pinion 31 through the half-revolution required for producing the closure of the shears, cutting off the drop of glass which will fall directly into the mold or upon a guide for carrying it to the same.

At the same time that this operation occurs, needle 3 will withdraw, carrying back the glass that has adhered to the end thereof towards the inside of the cup which, once the needle has withdrawn, will again turn the contrary way for returning to its normal position. This movement is produced by part 17—which rotates in the direction shown by the arrow—(Figure 5) acting on roll 15, thereby forcing sector 12 and, hence, pinion 11 fixed to the cup, to take the position shown on Figure 4, preparing the device for a new operation.

As can readily be appreciated, the timing of the parts is such that needle 3 will make a stroke each time the cup is turned.

It is evident that it will be possible to introduce alterations in the construction and details without affecting the scope of the invention, as defined in the following claims.

I claim as my invention:

1. An automatic glass feeder, comprising an open-topped vessel, having a lateral discharge opening, mounted to tilt downward and upward to bring said opening into and out of discharge position, and mechanism for positively imparting such tilting movements automatically to the vessel at regular intervals; said tilting mechanism embodying a gear rigidly connected with the vessel, a gear segment in mesh therewith, a drive shaft, a pair of members operative oppositely and in alternation on said segment, and connecting means between the drive shaft and said oppositely-acting members to actuate the latter from the former.

2. An automatic glass feeder, comprising an open-topped vessel, having a lateral discharge opening, mounted to tilt downward and upward to bring said opening into and out of discharge position, and mechanism for positively imparting such tilting movements automatically to the vessel at regular intervals; said tilting mechanism embodying a gear rigidly connected with the vessel, a gear segment in mesh therewith, and means for positively swinging said segment first in one direction and then in the other.

3. An automatic glass feeder, comprising an open-topped vessel, having a lateral discharge opening, mounted to tilt downward and upward to bring said opening into and out of discharge position, and mechanism for positively imparting such tilting movements automatically to the vessel at regular intervals; said tilting mechanism embodying a gear rigidly connected with the vessel, a gear segment in mesh therewith, means for positively swinging said segment first in one direction and then in the other, and means for arresting the vessel at the end of its movement in each direction.

4. An automatic glass feeder, comprising an open-topped vessel, having a lateral discharge opening, mounted to tilt downward and upward to bring said opening into and out of discharge position, and mechanism for positively imparting such tilting movements automatically to the vessel at regular intervals; said tilting mechanism embodying a gear rigidly connected with the vessel, a gear segment in mesh therewith, a pair of members operative oppositely and in alternation on said segment, and means for varying the working positions of said members with relation to the segment.

5. An automatic glass feeder, comprising an open-topped vessel, having a lateral discharge opening, mounted to tilt downward and upward to bring said opening into and out of discharge position, and mechanism for positively imparting such tilting movements automatically to the vessel at regular intervals; said tilting mechanism embodying a gear rigidly connected with the vessel, a gear segment in mesh therewith, an actuating arm attached to the segment and provided with a terminal roller, and a pair of members operative oppositely and in alternation upon said roller.

6. An automatic glass feeder, comprising an open-topped vessel, having a lateral discharge opening, mounted to tilt downward and upward to bring said opening into and out of discharge position, and mechanism for positively imparting such tilting movements automatically to the vessel at regular intervals; said tilting mechanism embodying a gear rigidly connected with the vessel, a gear segment in mesh therewith, an actuating arm attached to the segment and provided with a terminal roller, a pair of members operative oppositely and in alternation upon said roller, and means for adjusting the position of said members with relation to said roller.

7. An automatic glass feeder, comprising an open-topped vessel to receive molten glass having a lateral discharge opening, a vertically-reciprocating needle mounted above the open top of the vessel; and means for positively tilting said vessel downward about a horizontal axis at regular intervals into position to aline the discharge opening with said needle and thereby enable the latter to extrude a gob of glass therethrough during its downward movement.

8. An automatic glass feeder, comprising an open-topped vessel to receive molten glass having a lateral discharge opening; a vertically-reciprocating needle mounted above the open top of the vessel; means for positively tilting said vessel downward about a horizontal axis at regular intervals into position to aline the discharge opening with said needle and thereby enable the latter to extrude a gob of glass therethrough during its downward movement; a pair of shears for severing the extruded gob; and operating means for the shears connected with said tilting means to be actuated automatically by the same.

9. A feeder, according to claim 8, in which the shear-operating means comprise a mutilated gear driven by the tilting means, a gear periodically driven by the mutilated gear, a crank disk connected to be driven by the second-named gear, and connections between said disk and the shears for operating the latter from the former.

10. An automatic glass feeder, comprising a receiving vessel for molten glass having a discharge opening; a device for extruding a gob of glass at regular intervals through said opening; a pair of shears for severing the extruded gob; and means for operating the shears embodying a multilated gear, means for rotating it, a gear periodically driven by the mutilated gear, a crank disk connected to be driven by the second-named gear, and connections between said disk and the shears for operating the latter from the former.

11. An automatic glass feeder, comprising an open-topped receiving vessel having a lateral discharge opening; a device mounted above the open top of the vessel for periodically extruding a gob of glass through said opening; means for positively tilting said vessel downward about a horizontal axis at regular intervals into position to aline the discharge opening with said extruding device; a pair of shears for severing the extruded gob; and operating means for the shears connected with said tilting means to be actuated automatically by the same.

12. An automatic feeder, comprising an open-topped vessel to receive molten glass having a lateral discharge opening; a needle mounted above the open top of the vessel; means for positively tilting said vessel downward about a horizontal axis at regular intervals into position to aline the discharge opening with the needle; means for imparting a vertical reciprocating movement to said needle so as to project its lower end through said opening at the end of the down-stroke and thereby extrude a gob of glass; and means for severing the extruded gob; said needle, during its up-stroke, drawing back, through the discharge opening into the interior of the vessel, the remains of glass adhering to the needle at the moment when the gob is severed, said remains staying in the vessel while the latter occupies its non-discharging position.

In testimony whereof I affix my signature.

TANCREDO DE BIASE.